US011340062B2

(12) United States Patent
Klarner et al.

(10) Patent No.: US 11,340,062 B2
(45) Date of Patent: May 24, 2022

(54) DEVICE FOR OPTICALLY MEASURING THE EXTERNAL-THREAD PROFILE OF A PIPE

(71) Applicant: VOESTALPINE TUBULARS GMBH & CO KG, Kindberg-Aumühl (AT)

(72) Inventors: Jürgen Klarner, Mitterdorf (AT); Reinhard Leitner, Kindberg (AT); Peter Winkler, Krieglach (AT); Hannes Karner, Kindberg-Aumühl (AT)

(73) Assignee: VOESTALPINE TUBULARS GMBH & CO KG, Kindberg-Aumuhl (AT)

( * ) Notice: Subject to any disclaimer, the term of this patent is extended or adjusted under 35 U.S.C. 154(b) by 94 days.

(21) Appl. No.: 16/641,809

(22) PCT Filed: Nov. 8, 2018

(86) PCT No.: PCT/AT2018/000091
§ 371 (c)(1),
(2) Date: May 27, 2020

(87) PCT Pub. No.: WO2019/090371
PCT Pub. Date: May 16, 2019

(65) Prior Publication Data
US 2020/0284577 A1    Sep. 10, 2020

(30) Foreign Application Priority Data
Nov. 13, 2017    (AT) .................................. A 441/2017

(51) Int. Cl.
*G01B 11/24*    (2006.01)
*G01N 21/952*    (2006.01)

(52) U.S. Cl.
CPC ...... *G01B 11/2425* (2013.01); *G01B 11/2433* (2013.01); *G01N 21/952* (2013.01)

(58) Field of Classification Search
CPC ............ G01B 11/2425; G01B 11/2433; G01B 11/245; G01B 11/24; G01N 21/952
See application file for complete search history.

(56) References Cited

U.S. PATENT DOCUMENTS

| 2009/0101851 A1 | 4/2009 | Spalding |
| 2011/0181715 A1* | 7/2011 | Eales ................. G01B 11/2433 348/142 |

(Continued)

FOREIGN PATENT DOCUMENTS

| CN | 105716528 A | 6/2016 |
| EP | 2135030 A1 | 12/2009 |

(Continued)

OTHER PUBLICATIONS

International Search Report dated Feb. 18, 2019 issued in corresponding International Application No. PCT/AT2018/000091 (5 pgs.).

*Primary Examiner* — Michael P LaPage
(74) *Attorney, Agent, or Firm* — Pillsbury Winthrop Shaw Pittman, LLP

(57) ABSTRACT

In a device for optically measuring the external-thread profile of a pipe, comprising a support for the pipe to be measured and an optical measuring unit including at least one measuring device comprising a light source and a camera arranged in the optical path of the light source for recording a silhouette image of the external-thread profile, wherein the optical measuring unit is, in particular rigidly, mounted on a carrier element pivotally held about three spatial axes, the optical measuring unit comprises at least two measuring devices whose optical paths cross each other.

16 Claims, 4 Drawing Sheets

(56) References Cited

U.S. PATENT DOCUMENTS

| | | | |
|---|---|---|---|
| 2013/0258046 A1* | 10/2013 | Nygaard | G01N 21/952 348/36 |
| 2015/0022823 A1* | 1/2015 | Bonadeo | G01B 11/2425 356/601 |
| 2015/0199827 A1* | 7/2015 | Agazzi | G01B 11/245 382/106 |
| 2015/0241203 A1* | 8/2015 | Jordil | G01B 11/005 356/4.01 |
| 2016/0018214 A1 | 1/2016 | Penhorwood et al. | |
| 2017/0307541 A1* | 10/2017 | Offenborn | G01N 21/8901 |
| 2019/0137264 A1* | 5/2019 | Sauerland | G01B 11/2425 |

FOREIGN PATENT DOCUMENTS

| | | |
|---|---|---|
| EP | 2392896 A1 | 12/2011 |
| EP | 2767799 A1 | 8/2014 |
| JP | 2009-121900 A | 6/2009 |
| JP | 2013-246143 A | 12/2013 |
| WO | 01/09665 A3 | 2/2001 |
| WO | 2010/052463 A1 | 5/2010 |

* cited by examiner

DEVICE FOR OPTICALLY MEASURING THE EXTERNAL-THREAD PROFILE OF A PIPE

CROSS-REFERENCE TO RELATED APPLICATIONS

This application is a national stage entry of PCT/AT2018/0000091, filed Nov. 8, 2018, which claims priority to Austrian Application No. A 441/2017, filed Nov. 13, 2017, the entire contents of each of which are herein incorporated by reference in their entireties.

The invention relates to a device for optically measuring the external-thread profile of a pipe, comprising a support for the pipe to be measured and an optical measuring unit including at least one measuring device comprising a light source and a camera arranged in the optical path of the light source for recording a silhouette image of the external-thread profile, wherein the optical measuring unit is, in particular rigidly, mounted on a carrier element pivotally held about three spatial axes.

The invention further relates to a method for optically measuring the external-thread profile of a pipe using such a device.

High demands are placed on the threaded joints of pipe sections where tightness of the threaded joint is relevant. This applies, for instance, to pipelines for transporting pressurized fluids such as gas or oil, or to riser pipes for oil and gas production. In such cases, the pipe end provided with an external thread, of a pipe is threaded into the pipe end provided with a respective internal thread, of an adjoining pipe. In order to ensure tightness, the thread must be manufactured in a highly precise manner with the intended thread geometry. When producing such pipes, the thread geometry is, therefore, usually measured in the context of quality control.

From EP 2767799 A1, a method for automatically measuring pipe-end threads in the ongoing thread production process is known, in which a cleaning process is performed after the thread production, followed by a drying process, whereupon measuring of the pipe thread is performed under a clean atmosphere.

From EP 2135030 B1, a method using a device for optically measuring external-thread profiles on pipe ends can be taken, which is also applied in the production line in a clocked manner. The thread profile is determined using a measuring unit comprised of a camera and a backlighting source by acquiring a tangential silhouette image of the thread contour, and its evaluated optical signals are compared to set values. The position of the pipe end relative to the measuring unit is continuously sensed by laser triangulation, wherein scanning of the thread profile is performed by a relative movement carried out between the pipe and the measuring unit through rotation and translation.

A measuring assembly for measuring a thread on a pipe end using a camera and a light source for making a silhouette image is also disclosed in CN 105716528. That measuring device is comprised of two cameras with two associated light sources so as to be able to make an upper and a lower thread image.

A similar measuring assembly can be taken from EP 2392896 A1, in which a measuring sensor system is fixed to a measuring head rotationally and translationally movable on a frame of the measuring device. The measuring device is comprised of a computer-controlled laser sensor performing thread scanning by a computer-controlled mechanical movement system.

The optical measurement of an external thread with the aid of silhouette images involves the problem that the optical path of the light source, or the optical axis of the light source, has to be oriented at a right angle to the pipe axis of the pipe to be measured in order to obtain correct measurements, thus requiring an adjusting operation prior to measuring. Alternatively, the relative position of the measuring unit relative to the pipe can be determined and measurements can be corrected as a function of the relative position values. To this end, a laser triangulation is required in the subject matter of EP 2135030 B1, thus needing additional technical equipment.

The present invention, therefore, aims to achieve simplification of the measuring technique and the structure of the measuring device over the known devices and measuring methods by using silhouette images. At the same time, a highly precise measurement is to be ensured, while avoiding optically distorted silhouette images.

To solve this object, the invention in a device of the initially defined kind essentially provides that the optical measuring unit comprises at least two measuring devices whose optical paths cross each other. In that two measuring devices each comprising a light source and a camera are provided, silhouette images can be taken in two crossing directions, whereby the thus obtained silhouette images can be used both for checking the correct orientation of the measuring unit relative to the pipe axis and for the external-thread measuring process proper. Since in this case the two silhouette images made in two crossing direction are used, deviations of the measuring unit from the correct orientation relative to the axis of rotation can be determined in two viewing directions. The adjustment of the measuring unit is based on the detection of deviations of the optical path of the light source from a right angle to the pipe axis of the pipe to be measured and the correction of deviations, if any, by pivoting the carrier element of the measuring unit.

According to a preferred configuration, the optical paths of two measuring devices cross each other at an angle of 90°. This enables the correction of a misalignment of the measuring unit in two orthogonal spatial directions so as to enable the measuring plane of the measuring unit, which is spanned by the direction vectors of the crossing optical paths and extends in parallel with said direction vectors, to be effectively adjusted in a position perpendicular to the pipe axis. The optical paths of the two measuring devices are preferably located in the same plane which constitutes the measuring plane.

Contaminations, in particular fluids accumulating in the thread, might falsify the silhouette and lead to false measurements. The measuring devices are, therefore, preferably positionable such that the optical path of at least one measuring device encloses an angle of 10-80°, preferably 25-65°, in particular 35-55°, with the perpendicular line. Possible cutting emulsion residues are thus able to drain from those thread regions of which silhouettes are taken, and hence have no influence on a thread silhouette image, thus avoiding cumbersome advance cleaning.

In the evaluation, the following thread parameters can, inter alia, be determined from the silhouette image of the external thread of the pipe, which, in addition to the thread, may optionally also comprise the sealing surfaces:
  thread diameter
  thread taper
  thread pitch
  thread height
  sealing seat diameter
  sealing seat angle Since any type of mechanical misalignment of the measuring unit may lead to positioning inaccuracies, and hence to measurement errors, the measuring unit in a preferred manner is stationarily arranged on the carrier element.

In order to enable silhouette images to be taken by the measuring devices in a plurality of circumferential regions of the external thread, it is preferably provided that the carrier element is rotationally mounted about an axis of rotation located at a right angle to the measuring plane of the measuring unit. After having taken silhouette images in a first rotational position of the measuring unit, the latter can be further rotated about the axis of rotation by a defined angle in order to be able to take further silhouette images in the new rotational position.

Additionally or alternatively, at least a further measuring device comprising a light source and a camera can be provided on the carrier element in order to accelerate the measuring procedure.

In structural terms, a preferred configuration in this context provides that a rotary platform rotationally mounted about the axis of rotation is provided to support the carrier element. By rotating the rotary platform about the axis of rotation, a rotation of the measuring unit about a first spatial axis can be performed. The pivotal movement about the two other spatial axes of the spatial Cartesian coordinate system is preferably effected by a structure comprising, between the rotary platform and the carrier element, a device for the at least biaxial pivotability of the carrier element relative to the rotary platform about two crossing axes of rotation extending in parallel with the measuring plane, in particular a hexapod.

Alternatively, the hexapod can be arranged on the stationary housing and the rotary platform can be disposed between the hexapod and the carrier element.

A further preferred configuration provides that the at least two measuring devices comprise a telecentric optical path. By using telecentric lenses on the light source, the measuring accuracy can be guaranteed without having to know the distance between the external thread to be measured and the camera, since the measurement will not be changed by a perspective projection within a distance range of some millimeters. The telecentric illumination produces a beam of parallel light, thus largely minimizing reflections on the thread.

For smaller pipe diameters, a pair of light source and camera per measuring device will do, since a silhouette image has already captured the two thread areas located diametrically opposite relative to the pipe axis, the sealing surfaces and the end faces. With larger pipe diameters, the two pipe thread areas located diametrically opposite relative to the pipe axis, the sealing surfaces and the end faces are separately determined by using two measuring devices. The configuration to this end is preferably devised such that a further measuring device is each associated with the at least two measuring devices, each comprising an optical path extending in parallel thereto.

In order to eliminate disturbances from the environment, the rotary platform is preferably fastened to a stationary machine stand anchored in a vibration-freely mounted base.

In order to minimize environmental influences such as dust, emulsion mist, extraneous light, air draft and condensate formation, it is preferably provided that the device is arranged within a protective housing.

For calibrating the measuring unit, a calibration device comprising a calibration target movable into and out of the image field of the measuring unit is preferably provided. According to a second aspect, the invention relates to a method for optically measuring the external-thread profile of a pipe using a device according to the invention, comprising the steps of:

a) positioning the pipe to be measured on the support such that the pipe axis extends transversely to the measuring plane of the measuring unit and the external thread is arranged in the optical path between the light sources and the associated cameras;
b) orienting the measuring unit such that the measuring plane encloses a right angle with the pipe axis;
c) taking silhouette images of the external thread by the camera of at least one measuring device and evaluating said silhouette images.

Orienting the measuring unit according to step b) preferably comprises the steps of:
taking silhouette images of the end face of the pipe in two different directions located in the measuring plane, of the optical path in order to obtain a first and a second silhouette image;
uniaxially or biaxially pivoting the measuring unit until the first and the second silhouette images of the end face correspond to a straight line.

Alternatively, orienting the measuring unit according to step b) comprises the steps of:
taking a silhouette image each of two external thread points located diametrically opposite relative to the pipe axis, in a first direction located in the measuring plane, of the optical path in order to obtain a first and a second silhouette image of the external thread;
determining the symmetrical axis of the external thread by way of the first and the second silhouette images of the external thread;
determining the angular deviation of the symmetrical axis from an axis extending perpendicular to the measuring plane;
uniaxially pivoting the measuring unit until said angular deviation is 0;
repeating the above steps, wherein the silhouette images of two external thread points located diametrically opposite relative to the pipe axis are taken in a second direction located in the measuring plane, of the optical path, wherein the first direction and the second direction extend transversely to each other, in particular at an angle of 90°.

The silhouette images in step c) can be taken in at least two different directions of the optical path, which are located in the measuring plane. In a preferred manner, a plurality of silhouette images are taken in different directions of the optical path in order to measure the external thread preferably over its entire circumference.

Such a measurement will be particularly efficient if step c) comprises the, in particular simultaneous, taking of silhouette images by the cameras of the at least two measuring devices. This at least enables doubling of the number of simultaneously obtained silhouette images.

In a preferred manner, the taking of silhouette images in step c) is initially done in a first rotational position of the measuring unit, whereupon the measuring unit is rotated by a predefined angle about an axis of rotation extending perpendicular to the measuring plane and the taking of silhouette images is subsequently done in a second rotational position of the measuring unit.

BRIEF DESCRIPTION OF THE DRAWINGS

The invention will be explained in more detail below by way of an exemplary embodiment schematically illustrated in the drawing. Therein.

In FIG. 1, a pipe to be measured is denoted by 1. The pipe, whose pipe axis is denoted by 2, on its end comprises an external thread 3 whose profile is optically measured using the measuring unit 4. The pipe 1 rests on a support 5 comprising a roller table, wherein the orientation of the pipe 1 relative to the measuring unit 4 is to be effected such that the pipe axis 2 is oriented at a right angle to the measuring plane 18 of the measuring unit 4. In order to enable such an orientation, the measuring unit 4 comprises a carrier element 6, in particular in the form of a platform, which carries the measuring devices 7 and 8 of the measuring unit 4. The carrier element 6 is held on a rotary platform 11 via a hexapod 9 comprising six linear drives 10, the carrier element 6 thus being displaceable, in particular pivotable, about several axes relative to the rotary platform 11. The rotary platform 11 is mounted to rotate about an axis of rotation 12 relative to the stationary housing 13 so as to enable a rotation of the measuring unit 4 about the axis of rotation 12. The rotary platform is associated with a rotary drive (not illustrated) for driving the rotary platform as a function of control signals of a control device. The control device, in signal terms, is also connected to the linear drives 10 of the hexapod 9 so as to enable the control device to adjust the measuring unit 4 in several axes as a function of control signals in order to orient the measuring unit 4 with its measuring plane 18 at a right angle to the pipe axis 2.

Figure 1:
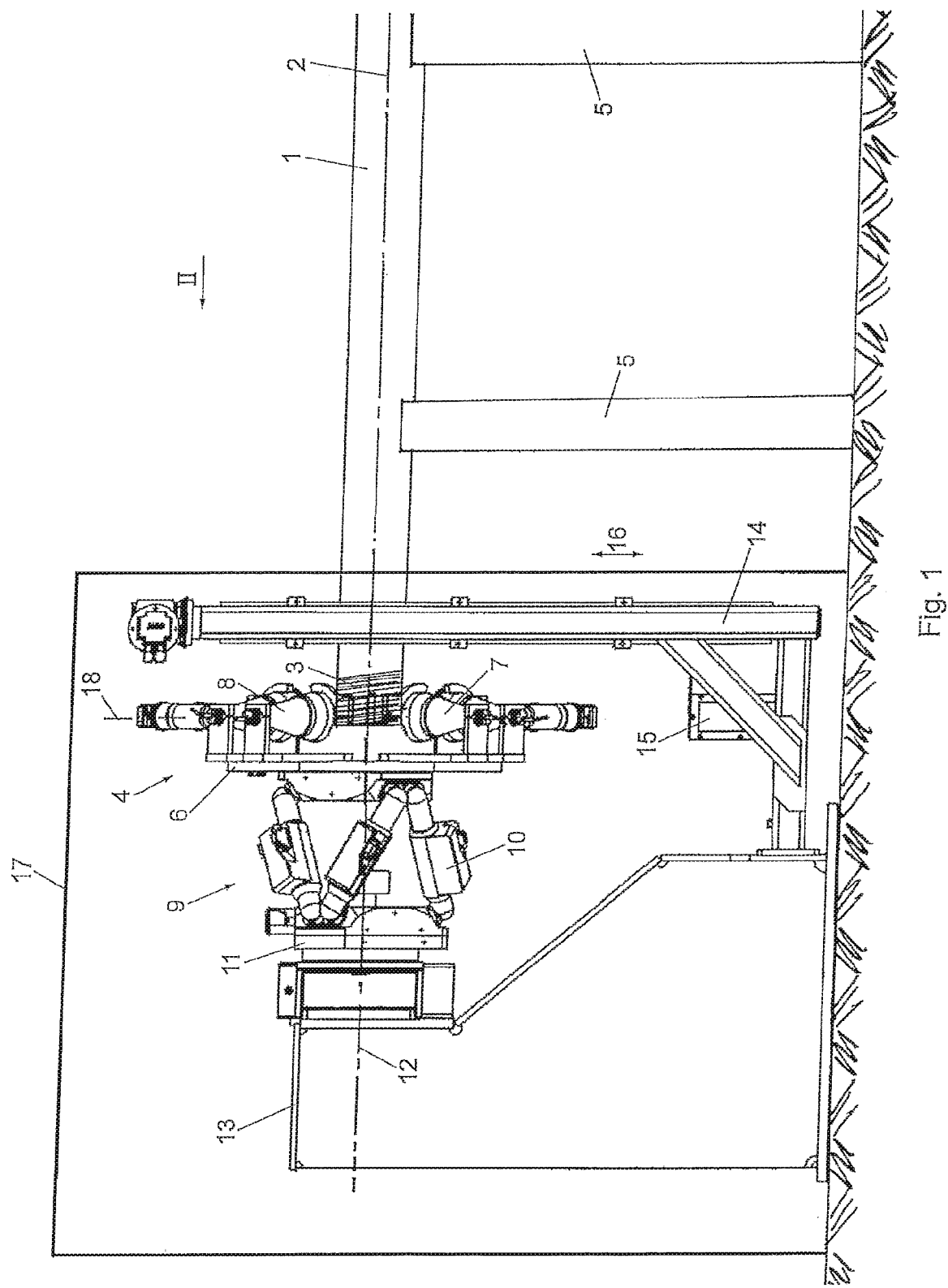
FIG. 1 is a side view of the device according to the invention.

From FIG. 1, a stationary bracket 14 is further apparent, which comprises a feed device for a calibration plate or calibration target 15 in order to move the latter in the sense of double arrow 16 into and out of the detection area of the measuring devices 7 and 8.

The measuring device according to the invention is surrounded by a protective housing 17 to eliminate environmental influences such as dust, emulsion mist, extraneous light, air draft, and condensate formation.

Figure 2:
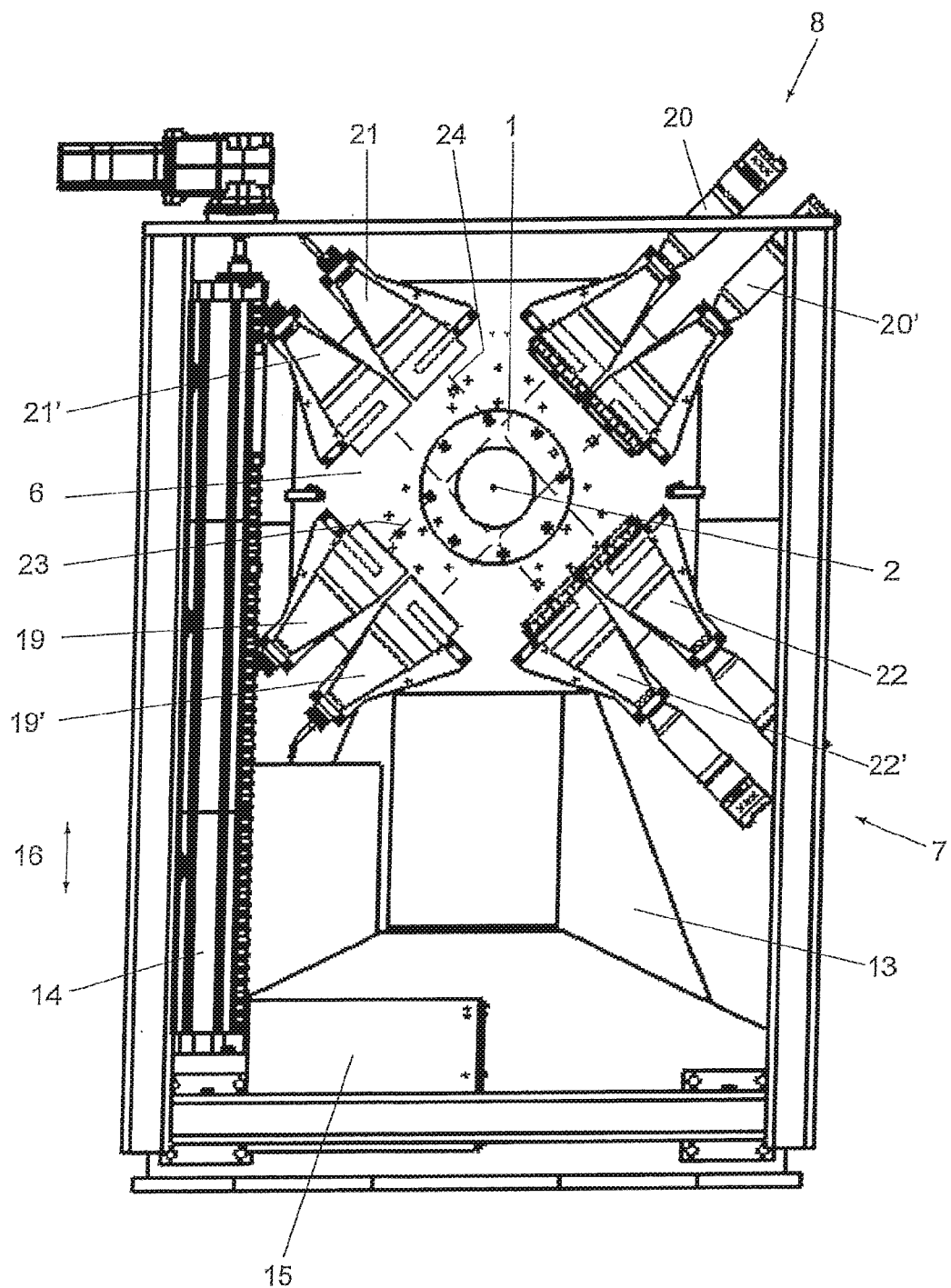
FIG. 2 is a view along arrow II of FIG. 1.

FIG. 2 depicts the structure of the measuring unit 4. The measuring unit 4 comprises at least two measuring devices 7 and 8 each comprising a light source and a camera disposed in the optical path of the light source for taking a silhouette image of the external-thread profile 3. The measuring device 7 in this case comprises a light source 21 with an optical path 24, and a camera 22 disposed in the optical path 24 on the opposite side of the pipe 1. Optionally, the measuring device 7 comprises a further system of light source 21' and camera 22' arranged in parallel with the first one. The measuring device 8 comprises a light source 19 with an optical path 23, and a camera 20 disposed in the optical path 23 on the opposite side of the pipe 1. Optionally, the measuring device 8 comprises a further system of light source 19' and camera 20' arranged in parallel with the first one. The measuring devices 7 and 8 are rigidly fastened to the carrier element 6, the optical paths 23 and 24 being oriented at a right angle relative to each other.

With pipes 1 having smaller diameters, a single system of light source and camera will do per measuring device in order to obtain silhouette images of the external thread 3 on two external-thread points located diametrically oppositely relative to the pipe axis 2. With pipes 1 having larger diameters, both systems of light source and camera are employed per measuring device, one of the systems producing or taking a silhouette image at one circumferential point, and the other system producing or taking a silhouette image at the circumferential point located diametrically opposite.

The measuring procedure will be explained in more detail by way of the following exemplary embodiment.

Figure 3:
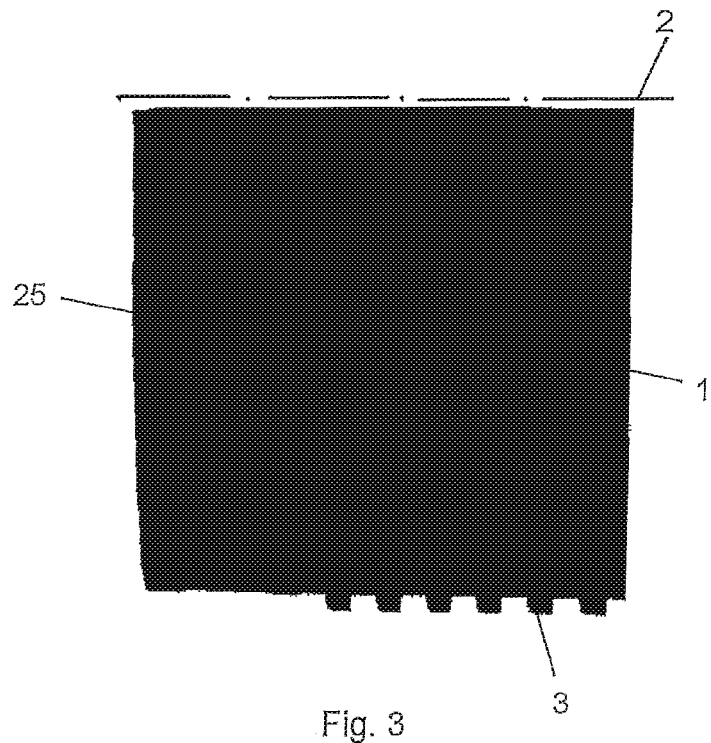
FIG. 3 shows a silhouette image of a tube end face having an ellipse.
Figure 4:
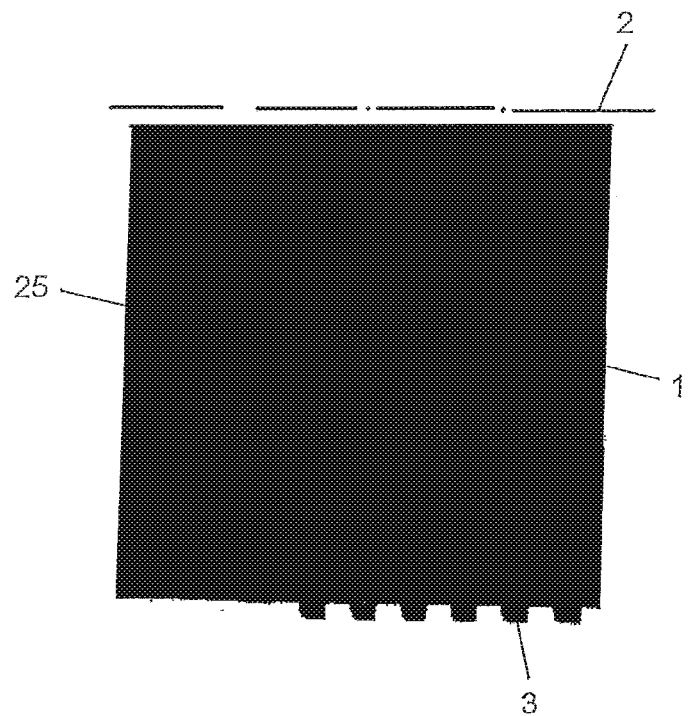
FIG. 4 shows a silhouette image of the tube end face having a straight line edge.

The pipe 1 is fed to the measuring unit 4 with its threaded end by means of a device provided at the end of the roller table, wherein only a coarse orientation of the longitudinal and height positions is effected. Fine adjustment for the precise orientation of the measuring unit 4 relative to the pipe axis 2 can be performed by two variants:

Variant A:

In this case, two images of the tube end face 25 are acquired as silhouette images of the two measuring devices 7 and 8, which are arranged on the carrier element 6 in an offset manner by 906, and readjustment is effected using the hexapod 9 until a silhouette image of the pipe end face 25 is no longer shown as an ellipse (FIG. 3) but as a straight line edge (FIG. 4). In the latter case, it is ensured that the plane spanned by the optical paths 23 and 24 (measuring plane 18) extends perpendicular to the pipe axis 2.

Figure 5:
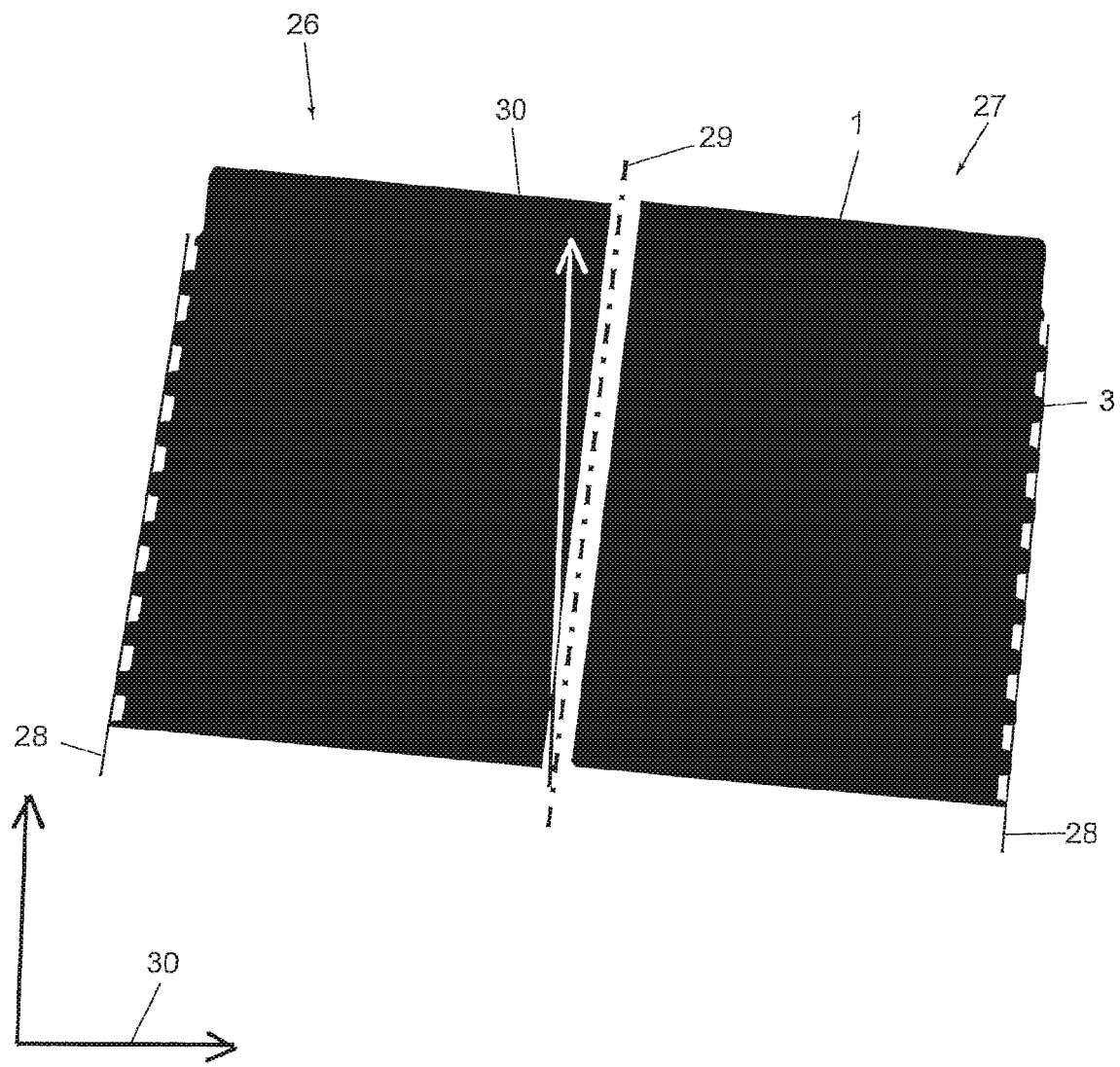
FIG. 5 shows two images of a pipe end taken by measuring devices.

Variant B:

Two images 26, 27 of the pipe end are taken by one of the measuring devices 7, 8 (left and right sides of the thread 2), and a straight line 28 is each determined along the thread taper (FIG. 5). A pipe axis 29 is calculated via the taper. Said pipe axis 29 comprises the same distances to the thread taper both on the left and on the right sides. The angle of inclination β between the pipe axis 29 and the sensor coordinate system 30 can be directly readjusted by the hexapod 9. The same procedure is performed using the other one of the two measuring devices 7, 8, which is offset by 90°. Also in this case, the angle of inclination of the carrier element 6 is corrected using the hexapod 9. After the described correction of the angle of inclination of the carrier element 9 in the two planes extending perpendicular to each other, the measuring unit 4 is oriented relative to the pipe end such that the measuring plane 18 is perpendicular to the pipe axis 2.

Following the described orientation, the thread parameters below can, inter alia, be determined in the evaluation from the silhouette image of the end portion of the pipe 1, which also comprises the sealing surfaces in addition to the thread 3, in the context of the measurements proper:

thread diameter
thread taper
thread pitch
thread height
sealing seat diameter
sealing seat angle Since any kind of mechanical misalignment of the measuring unit 4 may lead to positioning inaccuracies, and hence to measuring errors, the measuring devices 7, 8 are stationarily arranged on the carrier element 6.

Contaminations, in particular fluids accumulating in the thread 2, might falsify the silhouette image and lead to false measurements. In an advantageous manner, the measuring unit 4 is, therefore, placed on the carrier element 6 with the optical path inclined relative to the horizontal (cf. FIG. 2) rather than in a horizontal or vertical arrangement, so that possible residues of cutting emulsions are able to drain and have no influence on a thread silhouette image, and no cumbersome cleaning process is needed in advance.

The measuring apparatus further comprises a device for automatically introducing a calibration target 15 into the image field of the measuring unit.

Measuring Assembly:

By using telecentric lenses in the light sources 19 and 21, or cameras 20 and 22, the measuring accuracy can be guaranteed without having to know the distance between the thread 2 and the camera 20 or 22, respectively, since the measurement will not be changed by a perspective projection within a distance range of about +/−some millimeters. The telecentric illumination produces a beam of parallel light, thus largely minimizing reflections on the thread 2. The control of the apparatus is done via an evaluation computer or via the measuring software itself and can be integrated in a defined procedure by control. For the measurement, a coordinate system adapted to the coordinate system of the hexapod 9 is defined. This means that the measuring head and also the measuring coordinate system will co-rotate during a rotation of the rotary platform.

Measuring Procedure:

A measuring cycle consists of measuring the thread parameters in several rotational positions on the pipe 1. A coarse orientation and a subsequent fine orientation are performed for each of these rotational positions. The coarse orientation serves to perform a rapid orientation of the measuring unit 4 to the pipe end by a device provided at the end of the roller table. In doing so, corrections in all spatial directions and a first coarse correction of inclination are performed. If the pipe 1 has already been sufficiently precisely positioned mechanically in the measuring apparatus, this step may optionally be omitted.

After this, measuring images are taken, and the thread parameters are evaluated.

The invention claimed is:

1. A device for optically measuring an external-thread profile of a pipe, comprising:
   a support for the pipe to be measured, the pipe configured to extend along a pipe axis,
   an optical measuring unit including at least two measuring devices each comprising a light source and a camera arranged in an optical path of the light source for recording a silhouette image of the external-thread profile, and
   a carrier element,
   wherein the optical measuring unit is mounted on the carrier element and pivotally held about three spatial axes, wherein the at least two measuring devices have optical paths which cross each other,
   wherein direction vectors of the crossing optical paths lie within a measuring plane or are located in parallel with the measuring plane, wherein the carrier element is rotationally mounted about an axis of rotation located at a right angle to the measuring plane,
   wherein a rotary platform rotationally mounted about the axis of rotation is provided to support the carrier element, and
   wherein between the rotary platform and the carrier element, a device for the at least biaxial pivotability of the carrier element relative to the rotary platform about two intersecting axes of rotation extending in parallel with the measuring plane in the form of a hexapod is provided.

2. The device according to claim 1, wherein the optical paths of the at least two measuring devices cross each other at an angle of 90°.

3. The device according to claim 2, wherein the at least two measuring devices are positionable such that the optical path of at least one of the at least two measuring devices has an angle of 10-80° relative to a line through the measuring plane, the line being perpendicular to the pipe axis.

4. The device according to claim 1, wherein the at least two measuring devices comprise a telecentric optical path.

5. The device according to claim 1, wherein a further measuring device comprising a parallelly extending optical path is each associated with the at least two measuring devices.

6. The device according to claim 1, wherein the rotary platform is fastened to a stationary machine stand anchored in a base.

7. The device according to claim 1, wherein a protective housing is provided, in which the device is arranged.

8. The device according to claim 1, wherein a calibration device comprising a calibration target movable into and out of an image field of the optical measuring unit is provided.

9. A method for optically measuring the external-thread profile of a pipe using a device for optically measuring an external-thread profile of a pipe, comprising:
   a support for the pipe to be measured,
   an optical measuring unit including at least one measuring device comprising a light source and a camera arranged in an optical path of the light source for recording a silhouette image of the external-thread profile, and
   a carrier element,
   wherein the optical measuring unit is mounted on the carrier element and pivotally held about three spatial axes, wherein the optical measuring unit comprises at least two measuring devices whose optical paths cross each other, wherein direction vectors of the crossing optical paths lie within a measuring plane or are located in parallel with the measuring plane, wherein the carrier element is rotationally mounted about an axis of rotation located at a right angle to the measuring plane, the method comprising the steps of:
   a) positioning the pipe to be measured on the support such that an axis of the pipe extends transversely to the measuring plane of the at least two measuring devices and the external thread profile is arranged in the optical paths between the light source and the associated camera;
   b) orienting the optical measuring unit such that the measuring plane encloses a right angle with the axis of the pipe;
   c) taking silhouette images of the external thread profile by the camera of at least one of the at least two measuring devices and evaluating said silhouette images,
   wherein step b) comprises the steps of:
   taking a silhouette image each of two external thread profile points located diametrically opposite relative to the axis of the pipe in a first direction located in the measuring plane of the optical paths in order to obtain a first and a second silhouette image of the external thread profile;
   determining a symmetrical axis of the external thread profile by way of the first and the second silhouette images;
   determining an angular deviation of the symmetrical axis from an axis extending perpendicular to the measuring plane;
   uniaxially pivoting the optical measuring unit until said angular deviation is 0°;
   repeating the above steps, wherein the silhouette images of two external thread profile points located diametrically opposite relative to the axis of the pipe are taken in a second direction located in the measuring plane of the optical paths, wherein the first direction and the second direction extend transversely to each other at an angle of 90°.

10. The method according to claim 9, wherein the silhouette images in step c) are taken in at least two different directions of the optical paths, which are located in the measuring plane.

11. The method according to claim 10, wherein step c) comprises the taking of silhouette images by the camera of the at least two measuring devices.

12. The method according to claim 11, wherein the taking of silhouette images in step c) is initially done in a first rotational position of the optical measuring unit, whereupon the optical measuring unit is rotated by a predefined angle about an axis of rotation extending perpendicular to the measuring plane and the taking of silhouette images is subsequently done in a second rotational position of the optical measuring unit.

13. The method according to claim 10, wherein the taking of silhouette images in step c) is initially done in a first rotational position of the optical measuring unit, whereupon the optical measuring unit is rotated by a predefined angle about an axis of rotation extending perpendicular to the measuring plane and the taking of silhouette images is subsequently done in a second rotational position of the optical measuring unit.

14. A method for optically measuring the external-thread profile of a pipe using a device for optically measuring an external-thread profile of a pipe, comprising:
    a support for the pipe to be measured,
    an optical measuring unit including at least one measuring device comprising a light source and a camera arranged in an optical path of the light source for recording a silhouette image of the external-thread profile, and
    a carrier element,
        wherein the optical measuring unit is mounted on the carrier element and pivotally held about three spatial axes, wherein the optical measuring unit comprises at least two measuring devices whose optical paths cross each other, wherein direction vectors of the crossing optical paths lie within a measuring plane or are located in parallel with the measuring plane, wherein the carrier element is rotationally mounted about an axis of rotation located at a right angle to the measuring plane, the method comprising the steps of:
    a) positioning the pipe to be measured on the support such that an axis of the pipe extends transversely to the measuring plane of the at least two measuring devices and the external thread profile is arranged in the optical paths between the light source and the associated camera;
    b) orienting the optical measuring unit such that the measuring plane encloses a right angle with the axis of the pipe;
    c) taking silhouette images of the external thread profile by the camera of at least one of the at least two measuring devices and evaluating said silhouette images,
    wherein step b) comprises the steps of:
        taking silhouette images of an end face of the pipe in two different directions located in the measuring plane of the optical paths in order to obtain a first and a second silhouette image; and
        uniaxially or biaxially pivoting the optical measuring unit until the first and the second silhouette images of the end face correspond to a straight line.

15. The method according to claim 14, wherein the silhouette images in step c) are taken in at least two different directions of the optical path, which are located in the measuring plane.

16. The method according to claim 14, wherein the silhouette images in step c) are taken in at least two different directions of the optical path, which are located in the measuring plane.

* * * * *